Figure 1:
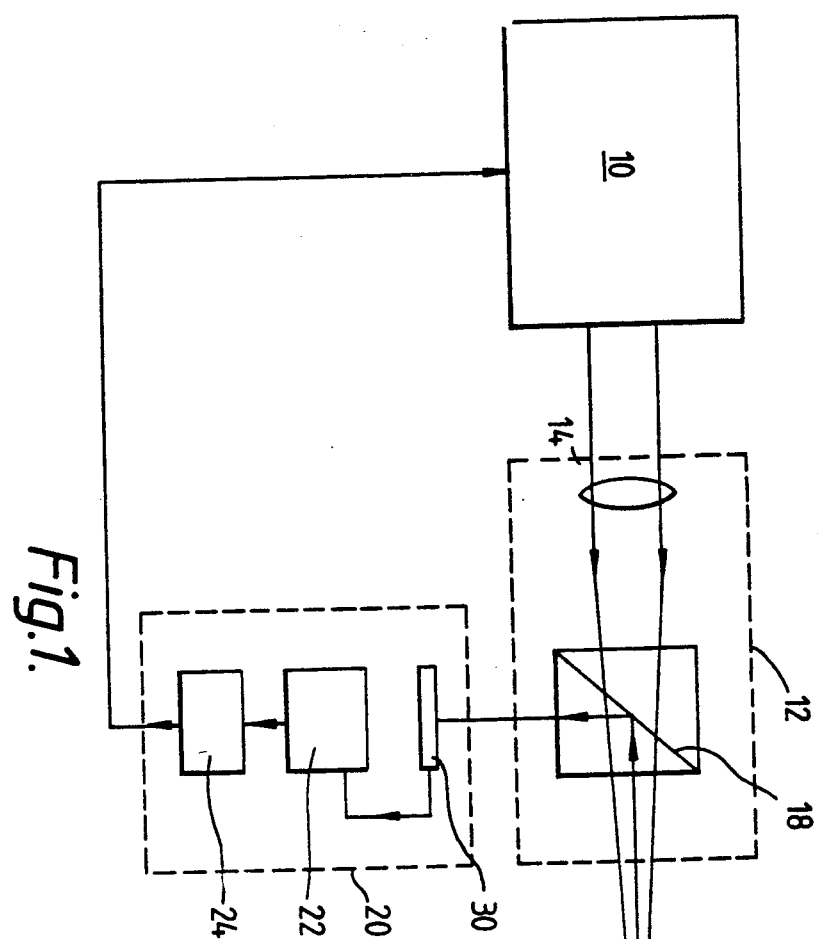

United States Patent [19]

Ma et al.

[11] Patent Number: 5,011,626
[45] Date of Patent: * Apr. 30, 1991

[54] BARRIER MATERIALS FOR LASER DRILLING

[75] Inventors: Kong Ma, Duluth; John T. Pinder, Marietta, both of Ga.

[73] Assignee: Rolls-Royce Inc., Greenwich, Conn.

[*] Notice: The portion of the term of this patent subsequent to Oct. 10, 2006 has been disclaimed.

[21] Appl. No.: 206,123

[22] Filed: Jun. 13, 1988

[51] Int. Cl.$^5$ .............................. F21V 9/00; B01F 3/00; B23K 26/04; B23K 26/00
[52] U.S. Cl. ................................... 252/582; 252/304; 219/121.62; 219/121.7
[58] Field of Search .................. 252/582, 583, 304; 219/121.7, 121.71, 121.72, 121.62

[56] References Cited

U.S. PATENT DOCUMENTS

| | | | |
|---|---|---|---|
| 4,202,697 | 5/1980 | Van Goethem et al. | 252/304 |
| 4,282,928 | 8/1981 | McDonald et al. | 252/304 |
| 4,657,345 | 4/1987 | Gordon | 252/582 |
| 4,689,307 | 8/1987 | Schwartz | 436/8 |
| 4,766,048 | 8/1988 | Hisamura | 430/58 |
| 4,873,414 | 10/1989 | Ma et al. | 219/121.7 |

Primary Examiner—John S. Maples
Assistant Examiner—Philip Tucker

[57] ABSTRACT

A barrier for use in laser drilling. The barrier is placed in front of those surfaces that one wishes to protect from the laser beam. The barrier comprises a thixotropic medium, for example polyacrylamide suspension in water. The medium includes material which will disperse the laser light and material which will emit light when exposed to the laser light. The light emitter materials could be luminescent materials, phosphorescent materials, or fluorescent materials.

7 Claims, 1 Drawing Sheet

BARRIER MATERIALS FOR LASER DRILLING

This invention relates to laser drilling of components, and in particular, although not exclusively, to drilling holes in gas turbine components such as turbine blades.

Laser drilling of holes, such as film-cooling holes, into internal passages of turbine blades has been known for some time. One problem has been that of preventing the laser beam damaging the far face of the passage opposite to where the beam breaks through. Another problem has been in preventing material sputtered or vaporized by the beam being deposited on the inner surfaces of the passages.

Attempts have been made to insert barriers in the passages, and indeed in passages which are large and do not have complicated shapes, it may be possible to use solid barriers. Attempts have also been made to pour liquids, such as waxes, but there have been difficulties in preventing the wax solidifying as soon as it contacts the cold metal turbine blade. Another difficulty has been in removing the wax and this has involved the use of steam autoclaves.

With current laser technology, it is known that the quality of the beam at the component surface may vary due to fluctuation of the laser beam energy, misalignment, and shape of the beam, or focusing problems with the optical system. This degradation will affect the quality of the results particularly for holes with diameters of 0.020 inches or smaller. Therefore, there is a need for a real-time hole size monitoring and laser control system to enhance the quality and consistency of results.

An object of the present invention is to provide a method of laser drilling which uses a barrier material that is easy to fill the cavities, is self supporting in the cavity, is easy to remove, and is effective in preventing the laser beam damaging the surfaces of the cavity.

A further object of the present invention is to provide a means for monitoring the size of the hole being drilled by the laser and for controlling the laser beam.

Figure 2:
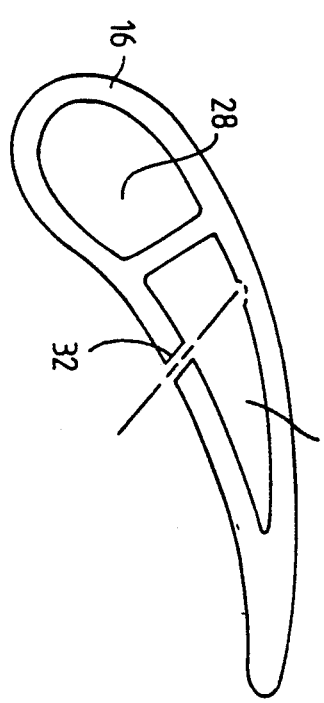

The invention will now be described, by way of an example, with reference to the accompanying drawings, in which:

FIG. 1 illustrates schematically apparatus incorporating the present invention and FIG. 2 illustrates a turbine blade suitable for being drilled using the apparatus of FIG. 1.

Referring to FIG. 1 of the drawings the apparatus comprises a pulsed Nd-YAG laser 10 (typically of the type manufactured and sold in the USA by RAYCON). The laser produces a beam of approximately 0.010 to 0.030 ins diameter with an average energy of 400 watts. An optical system 12 is provided which includes a lens 14 for focusing the laser beam on to the surface of the component to be drilled. The component 16 may be a turbine blade 16 as shown in FIG. 2. The optical system 12 includes a beam splitter 18 or half silvered mirror, which directs light received from the component to a monitoring and detection system 20. The monitoring system comprises a spectrographic analyzer 22, and a laser control system 24.

Referring to FIG. 2, there is shown schematically a cross-section through the airfoil of a turbine blade 16 which is to be drilled using the apparatus of FIG. 1. The turbine blade 16 comprises one or more cooling passages 28 which extend from the root portion through the airfoil portion. The apparatus of FIG. 1 is intended to be used for drilling the very small diameter film-cooling holes 32 which pass through the wall of the blade into the internal cavities or passages 28.

At least inner surfaces of the passages 28 are contacted prior to drilling the holes 32 with a visco-elastic medium which is a thixotropic slurry comprising material for dispersing the laser light and material which emits light when the laser light contacts it. Ideally the whole of the passages 28 are filled with the slurry.

The slurry can be a colloidal sol, a colloidal gel, or a mixture or suspension which is thixotropic, and will form at least a self supporting coating on the surfaces of the passages 28.

We prefer to use a slurry based on an anionically charged polyacrylamide such as that marketed in the USA by Southeastern Laboratories, Inc. under the Registered Trade Mark SELfloc 2240.

Polyacrylamide is a water soluble high polymer used as a flocculation agent in water and waste treatment applications. To the polyacrylamide is added acrylic acrylic particles, for example Amberlite (Registered Trade Mark of Rohm and Haas), which is effective in dispersing the laser beam. Other dispersants, such as polytetrafluoroethylene (PTFE), $TiO_2$, phosphors, and light scattering oxides could be used. The effectiveness of the laser dispersant material will depend upon the following factors.

(a) size of the dispersant particles—the preferred size is greater than the wave length of the laser light and probably in the range of 30 to 70 $\mu$m (or at least small enough not to block the hole to be drilled)

(b) amount of dispersant in the slurry (c) distance between the hole to be drilled and the far wall of the passage 28 (measured along the line of the drilling)

(d) hole size (e) pulse length of laser beam (f) power of laser pulse (g) effect of other additives To provide a method of detecting when the laser breaks through into the passage 28 and also to provide a way of indicating the hole size, a light emitting material is added to the slurry.

The light emitting material may be a chromophore of the electron donor type, such as for example an auxochrome or an electron acceptor type. The electron donor types would fluoresce at longer wavelengths than the exciting laser light where as the electron acceptor types emit shorter wavelengths. Suitable auxochromes are believed to be stilbene or its derivatives. Stilbene is insoluble in water and is well suited for our needs.

Other types of light emitting material may be suitable providing that they are relatively inert towards the alloy being drilled. For example, ionic complexes may be suitable. Indeed, phosphorescent, or luminescent materials may also be suitable.

We prefer to impregnate a fluorescent dye into the dispersant particles. These dyes produce light as specific wavelengths. It is thought to be advantageous to add the dye to the dispersant particles because the particles and dye could then be recovered and reused.

One example of a suitable slurry is one that comprises a suspension of 1 to 5% polyacrylamide in water in which is added typically 25% (or more) acrylic particles which have been colored by the application of a colored fluorescent dye.

In use, the thixotropic slurry is injected through a nozzle so as to impart a high amount of shear and thereby lower the viscosity to enable the slurry to flow readily into the passages 28. The slurry is allowed to become highly viscous and self supporting in the passage 28.

The turbine blade 16 is then positioned in the path of the laser beam and aligned to enable the desired holes to be drilled. The detection system 20 is set to discriminate between the spectrum of light emitted by the fluorescent material, and the light reflected or emitted by the turbine blade as it is drilled, and the laser is switched on to produce pulses of laser light.

As soon as the laser breaks through the wall of the turbine blade 16, and strikes the slurry, the light emitted by the fluorescent material is detected. The monitoring and detection system 20 has a two dimensional light sensitive receiver such as a digital camera 30 so that an image can be produced of the shape and size of the hole. Image intensifying devices and image analyzing devices could be employed to extract information from the image in terms of hole shape and size if desired. Hence the monitoring system can be programmed to respond to image of the shape and size of the hole to control the laser and switch it off when a predetermined shape and size is detected.

During drilling the slurry also protects the inner surfaces of the passages 28 and prevents any sputtered or vaporized materials from coating the surfaces of the passages 28. When drilling is complete the slurry is washed away by flowing water through the passages 28.

We claim:

1. A barrier material for use in laser machining to protect a surface which is in the path of the laser beam from being machined, the barrier material comprising a thixotropic aqueous suspension of acrylamide and including, as a laser light dispersant, acrylic particles.

2. A barrier material according to claim 1 wherein the barrier material contains a material which emits light when exposed to the laser beam.

3. A barrier material as claimed in claim 1 wherein the polyacrylamide comprises 1 to 5% by weight of the material.

4. A barrier material as claimed in claim 1 wherein the acrylic particles copmrise at least 25% by weight of the material.

5. A barrier material as claimed in claim 1 wherein the size of the acrylic particles is in the range of 30 micro-meters to 70 micrometers.

6. A barrier material according to claim 2 wherein the material which emits light is selected from the group consisting of a chromofore, an ionic complex, a phosphor, a fluorescent, a luminescent, and an auxochrome.

7. A barrier material as claimed in claim 6 wherein the material which emits light when exposed to the laser beam is stilbene or derivatives thereof.

* * * * *